United States Patent
Suzuki et al.

(10) Patent No.: US 10,205,328 B2
(45) Date of Patent: Feb. 12, 2019

(54) BICYCLE POWER CONTROL APPARATUS

(71) Applicant: Shimano Inc., Sakai, Osaka (JP)

(72) Inventors: Takafumi Suzuki, Osaka (JP); Yoshiyuki Kasai, Osaka (JP); Toshiyuki Takani, Osaka (JP)

(73) Assignee: Shimano Inc., Osaka (JP)

( * ) Notice: Subject to any disclaimer, the term of this patent is extended or adjusted under 35 U.S.C. 154(b) by 280 days.

(21) Appl. No.: 14/811,118

(22) Filed: Jul. 28, 2015

(65) Prior Publication Data

US 2016/0096493 A1    Apr. 7, 2016

(30) Foreign Application Priority Data

Oct. 3, 2014    (JP) .................................. 2014-204909

(51) Int. Cl.
*H02J 7/04* (2006.01)
*H02J 7/00* (2006.01)
*B62M 6/45* (2010.01)

(52) U.S. Cl.
CPC ............. *H02J 7/0029* (2013.01); *B62M 6/45* (2013.01); *H02J 7/045* (2013.01); *B60L 2200/12* (2013.01); *B62K 2204/00* (2013.01); *H02J 2007/0037* (2013.01)

(58) Field of Classification Search
CPC . Y02E 60/12; H02J 7/14; H02J 7/0068; H02J 7/0029; H02J 2007/0037; H01M 10/44; H01M 10/441; B62M 6/45; B62K 2204/00
USPC .......................................................... 320/162
See application file for complete search history.

(56) References Cited

U.S. PATENT DOCUMENTS

| 5,656,916 A * | 8/1997 | Hotta ...................... B60L 1/003 180/65.1 |
| 6,050,585 A * | 4/2000 | Rai .......................... B62J 1/10 280/220 |
| 7,408,447 B2 * | 8/2008 | Watson .................... B62J 99/00 340/432 |
| 2002/0079851 A1 | 6/2002 | Uno |
| 2002/0120382 A1 * | 8/2002 | Hatanaka ............ B60L 11/1803 701/70 |

(Continued)

FOREIGN PATENT DOCUMENTS

EP    2921676 A1 *    9/2015    ......... F02D 41/2422
JP    2002-187584 A    7/2002

(Continued)

*Primary Examiner* — Yalkew Fantu
*Assistant Examiner* — Mohammed J Sharief
(74) *Attorney, Agent, or Firm* — Global IP Counselors, LLP

(57) ABSTRACT

A bicycle power control apparatus is basically provided with a rectifier, a storage battery, a detection unit and a controller. The rectifier is configured to rectify power generated by an AC generator that is mounted on a bicycle. The storage battery is configured to store DC power outputted by the rectifier. The storage battery is configured to supply the DC power to an electric component that is mounted to the bicycle. The detection unit is configured to detect an electrical signal from the AC generator. The controller is configured to control a ratio of a distributed amount of the DC power to the electric component with respect to a distributed amount of the DC power to the storage battery according to the detection result of the detection unit.

21 Claims, 3 Drawing Sheets

(56) References Cited

U.S. PATENT DOCUMENTS

| | | | | |
|---|---|---|---|---|
| 2004/0195025 | A1* | 10/2004 | Kitamura | B60L 1/16 180/206.2 |
| 2006/0025958 | A1* | 2/2006 | Li | B60Q 9/006 702/142 |
| 2007/0152601 | A1* | 7/2007 | Nerone | H02M 1/15 315/209 R |
| 2010/0277495 | A1* | 11/2010 | Taguchi | B60K 35/00 345/589 |
| 2011/0025123 | A1 | 2/2011 | Tsai | |
| 2011/0163601 | A1* | 7/2011 | Li | H02J 7/0068 307/48 |
| 2012/0049517 | A1* | 3/2012 | Yasugi | F03D 7/0284 290/44 |
| 2012/0256568 | A1* | 10/2012 | Lee | H02J 7/0024 318/139 |
| 2013/0033234 | A1* | 2/2013 | Koritarov | H02J 7/04 320/137 |
| 2014/0145671 | A1* | 5/2014 | Liu | H02J 7/007 320/107 |
| 2014/0253042 | A1* | 9/2014 | Su | H02J 7/0031 320/134 |
| 2014/0297009 | A1* | 10/2014 | Bass | G01L 3/242 700/91 |

FOREIGN PATENT DOCUMENTS

| | | |
|---|---|---|
| JP | 2002-262473 A | 9/2002 |
| JP | 2002-274461 A | 9/2002 |
| JP | 2006-325372 A | 11/2006 |
| JP | 2008-110644 A | 5/2008 |
| JP | 2009-126475 A | 6/2009 |
| JP | 3162675 U | 9/2010 |
| JP | 2011-73638 A | 4/2011 |

* cited by examiner

BICYCLE POWER CONTROL APPARATUS

CROSS-REFERENCE TO RELATED APPLICATIONS

This application claims priority to Japanese Patent Application No. 2014-204909, filed on Oct. 3, 2014. The entire disclosure of Japanese Patent Application No. 2014-204909 is hereby incorporated herein by reference.

BACKGROUND

Field of the Invention

This invention generally relates to a bicycle power control apparatus. More specifically, the present invention relates to a bicycle power control apparatus for distributing power from an AC generator.

Background Information

Some bicycles are provided with one or more electric components (e.g., a lamp and an electric transmission) that receive power from an AC generator. The supply of power to each electric component is often controlled by a bicycle power control apparatus. One example of a bicycle with a bicycle power control apparatus for controlling the supply of power to electric components (e.g., a lamp) from an AC generator is disclosed in Japanese Laid-Open Patent Publication No. 2002-262473. In this conventional bicycle power control apparatus, the AC generator and the lamp are connected in series. The lamp is driven by the generated power of the AC generator. Power is supplied to the lamp from the storage battery. The bicycle power control apparatus drives a switch that is disposed between the AC generator and the lamp according to the voltage of the storage battery. Specifically, the bicycle power control apparatus limits the power supply to the lamp by controlling the switch so that charging the storage battery is given priority when the voltage of the storage battery is less than a prescribed value.

SUMMARY

Generally, the present disclosure is directed to various features of a bicycle power control apparatus for distributing power from an AC generator to one or more electric components. In the conventional bicycle power control apparatus disclosed in Japanese Laid-Open Patent Publication No. 2002-262473, when the voltage of the storage battery becomes less than a prescribed value, the generated power of the AC generator will be mainly distributed to the storage battery. Thus, power will not be supplied to the lamp even when the generated power is great, such as when traveling at a high speed, so long as the voltage of the storage battery is less than a prescribed value. Preferably, the light intensity of the lamp should be sufficient during high-speed traveling. As a result, the distribution of the generated power according to conventional technology is not always appropriate. In this way, in a bicycle, there is room for improvement regarding the control of the distribution of the generated power.

The present invention was made in tight of such circumstances. One aspect is to provide a bicycle power control apparatus that is able to distribute generated power to a storage battery and electric components at a desired ratio.

In view of the state of the known technology and in accordance with a first aspect of the present disclosure, a bicycle power control apparatus is provided that basically comprises a rectifier, a storage battery, a detection unit and a controller. The rectifier is configured to rectify power generated by an AC generator that is mounted on a bicycle. The storage battery is configured to store DC power outputted by the rectifier. The storage battery is configured to supply the DC power to an electric component that is mounted to the bicycle. The detection unit is configured to detect an electrical signal from the AC generator. The controller is configured to control a ratio of a distributed amount of the DC power to the electric component with respect to a distributed amount of the DC power to the storage battery according to the detection result of the detection unit.

In accordance with a second aspect of the present invention, the bicycle power control apparatus according to the first aspect is configured so that the electrical signal comprises information corresponding to an amount of power generated by the AC generator.

In accordance with a third aspect of the present invention, the bicycle power control apparatus according to the first or second aspect is configured so that the controller is configured to output a control signal that corresponds to the ratio to a drive circuit for driving the electric component.

In accordance with a fourth aspect of the present invention, the bicycle power control apparatus according to the third aspect is configured so that the controller is configured to modulate a pulse width based on the ratio, forms a pulse width modulation signal, and controls the drive circuit based on the pulse width modulation signal. The drive circuit is configured to form an applied voltage that corresponds the DC power to the pulse width modulation signal and applies the applied voltage to the electric component.

In accordance with a fifth aspect of the present invention, the bicycle power control apparatus according to any one of the first to fourth aspects is configured so that the detection unit is configured to detect a speed parameter, which is related to a bicycle speed, as the electrical signal.

In accordance with a sixth aspect of the present invention, the bicycle power control apparatus according to the fifth aspect is configured so that the detection unit is configured to detect a frequency of a pulsating flow, which is formed in the rectifier, as the speed parameter.

In accordance with a seventh aspect of the present invention, the bicycle power control apparatus according to any one of the fifth aspect is configured so that the detection unit is configured to detect a ripple frequency of a direct current, which is formed in the rectifier, as the speed parameter.

In accordance with an eighth aspect of the present invention, the bicycle power control apparatus according to the fifth aspect is configured so that the detection unit is configured to use a rotor position detection signal that is output from the AC generator, as the speed parameter.

In accordance with a ninth aspect of the present invention, the bicycle power control apparatus according to the fifth aspect is configured so that the detection unit is configured to detect a rotational speed of a wheel as the speed parameter.

In accordance with a tenth aspect of the present invention, the bicycle power control apparatus according to any one of the fifth to ninth aspects is configured so that the detection unit is configured to pulse the speed parameter and outputs the speed parameter to the controller.

In accordance with an eleventh aspect of the present invention, the bicycle power control apparatus according to any one of the fifth to tenth aspects is configured so that the controller is configured to set the distributed amount of the DC power to the storage battery to zero when a bicycle speed corresponding to the speed parameter is less than or equal to a prescribed value.

In accordance with a twelfth aspect of the present invention, the bicycle power control apparatus according to the eleventh aspect is configured so that the prescribed value is a value that is less than 5 km/h.

In accordance with a thirteenth aspect of the present invention, the bicycle power control apparatus according to any one of the fifth to twelfth aspects is configured so that the controller includes a map in which the speed parameter and the ratio are associated, and the ratio is defined as a value that is greater than or equal to one when the bicycle speed corresponding to the speed parameter is within a range that is greater than or equal to a set value in the control map.

In accordance with a fourteenth aspect of the present invention, the bicycle power control apparatus according to the thirteenth aspect is configured so that the controller has a map in which the speed parameter and the ratio are associated, and the ratio is defined to increase as the speed parameter in the map increases.

In accordance with a fifteenth aspect of the present invention, the bicycle power control apparatus according to any one of the fifth to fourteenth aspects is configured so that the controller has a map in which the speed parameter and the ratio are associated, and the ratio is defined so that the distributed amount of the DC power to the electric component increases as the speed parameter increases.

In accordance with a sixteenth aspect of the present invention, the bicycle power control apparatus according to any one of the first to fifteenth aspects is configured so that the electric component and the storage battery are connected in parallel with respect to the AC generator.

In accordance with a seventeenth aspect of the present invention, the bicycle power control apparatus according to any one of the first to sixteenth aspects further comprises an overcharge protection circuit configured to stop power being supplied to the storage battery white an inter-terminal voltage of the storage battery is greater than or equal to an upper limit voltage value.

In accordance with an eighteenth aspect of the present invention, the bicycle power control apparatus according to any one of the first to seventeenth aspects is configured so that the electric component is a lamp.

In accordance with a nineteenth aspect of the present invention, the bicycle power control apparatus according to any one of the first to seventeenth aspects is configured so that the electric component is a portable battery.

In accordance with a twentieth aspect of the present invention, the bicycle power control apparatus according to any one of the first to seventeenth aspects further comprises a separate electric component that is separate from the electric component and connected in parallel to the storage battery.

In accordance with a twenty-first aspect of the present invention, the bicycle power control apparatus according to the twentieth aspect is configured an that the separate electric component comprises at least one of a bicycle electric transmission, a bicycle electric suspension, a bicycle electric seatpost, and an operating switch, and the operating switch is configured to operate at least one of the bicycle electric transmission, the bicycle electric suspension and the bicycle electric seatpost.

In accordance with a twenty-second aspect of the present invention, the bicycle power control apparatus according to any one of the first to twenty-first aspects is configured so that at least the storage battery and the controller are housed in a case that is configured to be attached to the bicycle.

In accordance with a twenty-third aspect of the present invention, a bicycle power control apparatus a bicycle power control apparatus is provided that basically comprise a rectifier, a storage battery, a detection unit and a controller. The rectifier is configured to rectify power generated by an AC generator that is mounted on a bicycle. The storage battery is configured to store DC power outputted by the rectifier. The storage battery is configured to supply the DC power to an electric component that is mounted to the bicycle. The detection unit is configured to detect a bicycle traveling speed. The controller is configured to control a ratio of a distributed amount of the DC power to the electric component with respect to a distributed amount of the DC power to the storage battery according to the detection result of the detection unit.

With the abovementioned configurations, the bicycle power control apparatus is able to distribute generated power to a storage battery and the electric components at a desired ratio.

Also other objects, features, aspects and advantages of the disclosed bicycle power control apparatus will become apparent to those skilled in the art from the following detailed description, which, taken in conjunction with the annexed drawings, discloses embodiments of the bicycle power control apparatus.

BRIEF DESCRIPTION OF THE DRAWINGS

Referring now to the attached drawings which form a part of this original disclosure.

DETAILED DESCRIPTION OF EMBODIMENTS

Figure 1:
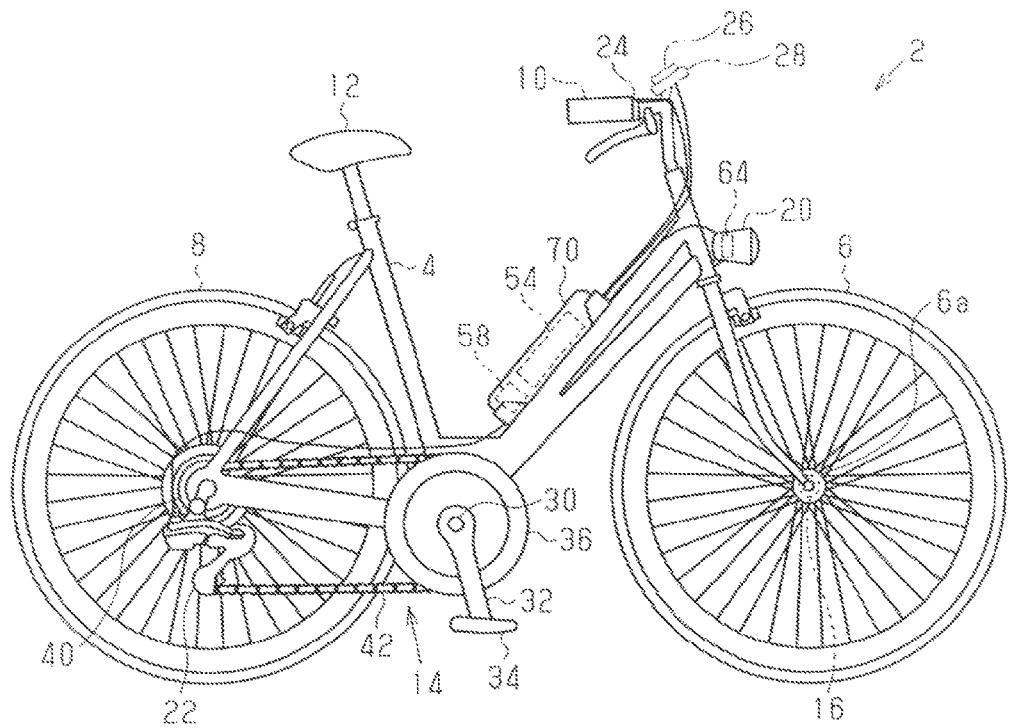
FIG. 1 is a side elevational view of a bicycle that is equipped with a bicycle power control apparatus in accordance with one illustrated embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Referring to FIGS. 1 to 5, a bicycle 2 is illustrated that is equipped with a bicycle power control apparatus in accordance with a first embodiment. The bicycle 2 comprises a frame 4, a front wheel 6, a rear wheel 8, a handlebar 10, a saddle 12, a drive mechanism 14, an AC generator 16 and a bicycle power control apparatus 18. The AC generator 16 is installed in a hub 6a of the front wheel 6. The front wheel 6 and the rear wheel 8 are rotatably attached to the frame 4. The bicycle 2 further comprises a lamp 20, an electric derailleur 22 and an electric shifter 24. The electric shifter 24 operates the electric derailleur 22. The bicycle power control apparatus 18 is provided for controlling the supply of power from the AC generator 16 to the electric components (e.g., the lamp 20, the electric derailleur 22 and the electric shifter 24).

The drive mechanism 14 comprises a crankshaft 30, a crank arm 32, a pedal 34 that is attached to the crank arm 32, a sprocket 36, a transmission gear 40, and a chain 42 for transmitting the power that is applied to the pedal 34 to the rear wheel 8.

The AC generator 16 comprises at least a coil and a magnet. The AC generator 16 is installed in a hub 6a of the front wheel 6. For example, either the coil or the magnet is fixed to a hub shaft of the front wheel 6, and the other of the coil or the magnet is fixed to a hub body into which the hub shaft is inserted.

Figure 2:
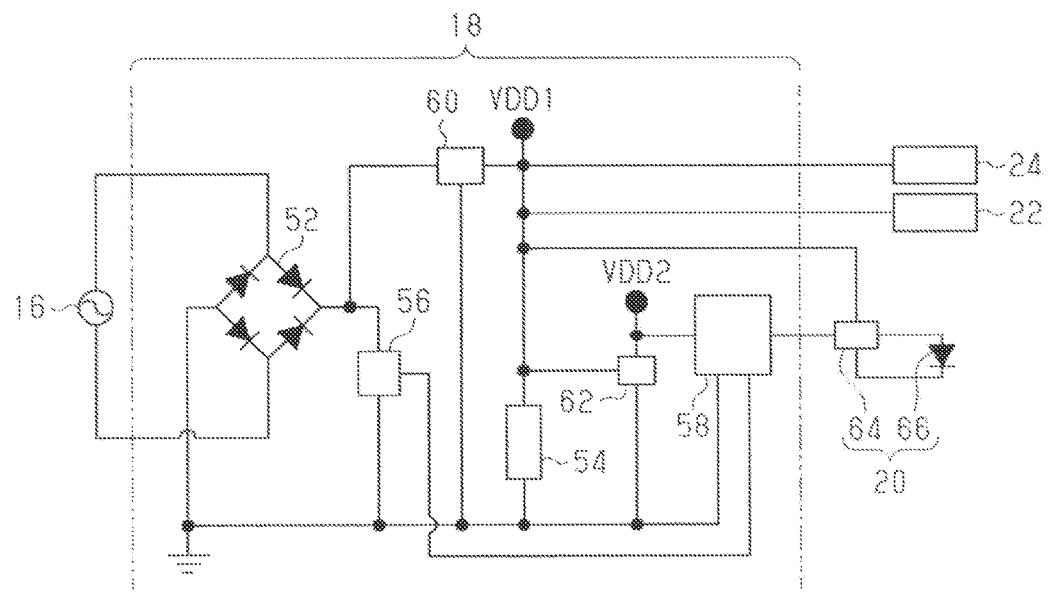
FIG. 2 is a block diagram of the bicycle power control apparatus for the bicycle illustrated in FIG. 1.

The bicycle power control apparatus 18 will be described with reference to FIG. 2. The bicycle power control apparatus 18 distributes the power that is generated by the AC generator 16 to the storage battery 54 and the lamp 20. The bicycle power control apparatus 18 comprises a rectifier 52, a storage battery 54, a detection unit 56 for detecting an electrical signal from the AC generator 16, and a controller 58. Of the bicycle power control apparatus 18, the storage battery 54 and the controller 58 are housed in a case 70 that is attached to the bicycle 2.

The controller 58 is a microcomputer that has at least one control circuit with at least one processor and at least one memory device. The memory device includes software that controls the AC generator 16 as explained below. In particular, as discussed below, the controller 58 is programmed to control the AC generator 16 so as to control a ratio of a distributed amount of the DC power to the electric component(s) with respect to a distributed amount of the DC power to the storage battery 54 according to the detection result of the detection unit 56.

The rectifier 52 performs a full-wave rectification on the alternating current of the AC generator and forms a direct current (voltage VDD1). The rectifier 52 is comprised of, for example, a diode bridge. A smoothing circuit, a noise reduction circuit, etc. may be provided to the rectifier 52. The storage battery 54 and the lamp 20 are connected to the rectifier 52, and the tamp 20 and the storage battery 54 are connected in parallel to the AC generator 16. For this reason, the lamp 20 receives a power supply from the AC generator 16 when the AC generator 16 generates power and receives a power supply from the storage battery 54 when the AC generator 16 does not generate power. All of the power from the AC generator 16 can be first stored in the storage battery 54, and the power supply amount from the storage battery 54 to the lamp 20 can be controlled by the controller 58. That is, power can be supplied from the storage battery 54 to the lamp 20, or the DC power from the AC generator 16 can be supplied to the lamp 20 without passing through the storage battery 54.

The storage battery 54 is charged by the DC power that is output by the rectifier 52. Additionally, the storage battery 54 supplies DC power to various electric components (an electric derailleur 22, an electric shifter 24, etc.) that are mounted to the bicycle 2.

The storage battery 54 is comprised of, for example, secondary batteries, such as a lithium ion battery, a lithium battery, a nickel-cadmium battery, and a nickel hydrogen battery, or a large-capacity capacitor, such as an electric double-layer capacitor, or a combination thereof.

An overcharge protection circuit 60 is disposed between the storage battery 54 and the rectifier 52. The overcharge protection circuit 60 grounds the DC power from the rectifier 52 when, for example, the inter-terminal voltage of the storage battery 54 exceeds an upper limit voltage value.

The detection unit 56 detects an electrical signal from the AC generator 16, pulses the detected electrical signal, and converts this into a digital signal. The detection unit 56 detects a signal that includes information corresponding to the amount of generated power from the AC generator 16 as one example of an electrical signal from the AC generator 16. Specifically, an electrical signal from the AC generator 16 comprises a peak value of the AC voltage, an average current of the direct current that is formed by the rectifier 52, the speed parameter related to the bicycle speed (including a pulse signal) and the like.

Examples of a speed parameter related to the bicycle speed include the frequency of the pulsating flow that is formed in the rectifier 52, the ripple frequency when the pulsating flow is smoothed, the rotor position detection signal of a sensor that may be provided to the AC generator 16, the frequency of the alternating current that is formed by the AC generator 16, the rotational speed of a wheel that may be derived from the frequency of the alternating current that is formed by the AC generator 16, or the like.

In the present embodiment, the detection unit 56 detects an undulating voltage of the DC power that is generated by the rectifier 52 as the electrical signal from the AC generator 16, pulses (digitizes) the frequency of the pulsating flow, and outputs this.

The controller 58 is connected to the storage battery 54 via a constant voltage circuit 62. The constant voltage circuit 62 is, for example, comprised of a booster circuit that forms a voltage VDD2. The controller 58 controls a ratio of the distributed amount regarding the DC power according to the detection result of the detection unit 56. This control is hereinafter referred to as the "power distribution control". Specifically, the controller 58 forms a control signal for controlling a drive circuit 64 mentioned below based on the detection result from the detection unit 56. The control signal is a signal for indicating the magnitude of the applied voltage that is formed by the drive circuit 64. For example, the control signal is configured as a pulse width modulation signal that is modulated based on the ratio of the distributed amount regarding the DC power.

The detection result from the detection unit 56 shows the electrical signal (the electrical signal from the AC generator 16) that is detected by the detection unit 56.

The "ratio of a distributed amount regarding the DC power" in a power distribution control is the ratio (M2/M1) of the distributed amount (M2) of the DC power to specific electric components (hereinafter referred to as "specific electric components") with respect to the distributed amount (M1) of the DC power to the storage battery 54.

Examples of specific electric components are electric devices that require a continuous power supply, for example, a portable battery 26 (the chain double-dashed line in FIG. 2) that is mounted to the lamp 20 or the charger 28.

In the present embodiment, a lamp 20 is exemplified as the specific electric component. The lamp 20 comprises a drive circuit 64 and an LED 66 (Light Emitting Diode). The LED 66 receives power via a drive circuit 64. The drive circuit 64 forms an applied voltage that is applied to the LED 66 based on a control signal from the controller 58. The drive circuit 64 forms an applied voltage of a magnitude corresponding to the control signal by DC-DC conversion, based on the DC power from the rectifier 52. For example, the drive circuit 64 is comprised of a switching circuit. The emission intensity of the LED 66 is configured to change according to the control signal.

The control that is executed by the controller 58 (power distribution control) and the effects thereof will be described with reference to FIG. 3. Power distribution control is performed in the following manner. The controller 58 comprises a control map for controlling a ratio regarding the DC power. The control map is created based on a distribution map. The distribution map defines the relationship between a parameter that is detected by the detection unit 56 (i.e., an electrical signal) and the ratio of the distributed amount regarding the DC power.

Figure 3:
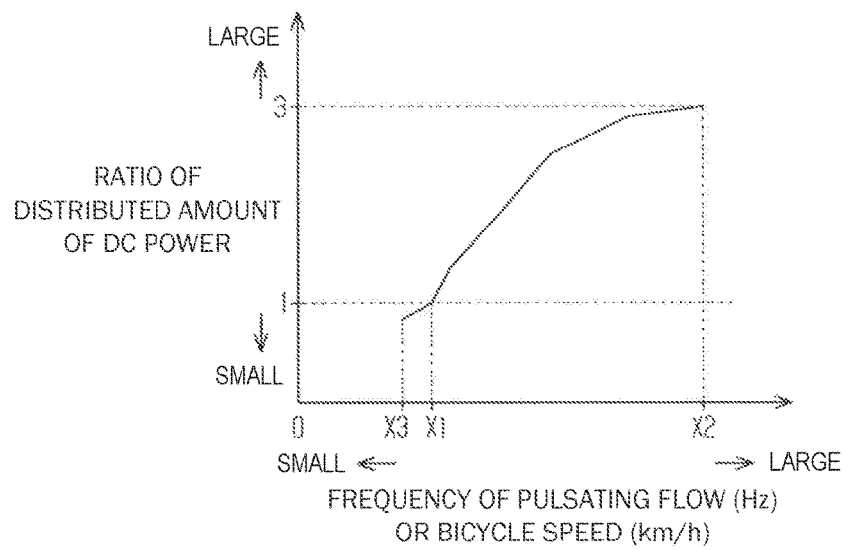
FIG. 3 is a distribution map that defines the relationship between a frequency of a pulsating flow and a ratio of a distributed amount regarding the DC power.

For example, as shown in FIG. 3, the ratio (M2/M1) of the distributed amount regarding the DC power with respect to the frequency of the pulsating flow is defined in the distribution map. In this example, when the frequency of the pulsating flow is a first set value X1 (for example, when the bicycle speed is 5 km/h), the ratio of the distributed amount is defined to be 1. When the frequency of the pulsating flow is a second set value X2 (for example, when the bicycle speed is 20 km/h), the ratio of the distributed amount is defined to be 3.0. Then, the frequency of the pulsating flow is defined so that, within the range of greater than or equal to the first set value X1 and less than or equal to the second set value X2, the ratio of the distributed amount will increase as the frequency of the pulsating flow increases and so that the rate of change of the ratio with respect to the increase in the frequency of the pulsating flow will gradually decrease.

The ratio is defined so that, when the frequency of the pulsating flow is less than or equal to a third set value X3, 100% of the DC power is supplied to the lamp 20 and so that the DC power will not be supplied to the storage battery 54. The configuration may also be such that the DC power is first stored in the storage battery 54, after which the stored DC power is supplied from the storage battery 54 to the lamp 20. In this type of configuration, when the frequency of the pulsating flow is less than or equal to the third set value X3, the value of the ratio becomes infinity. Accordingly, the ratio is, for example, set to the maximum definable value (diagram omitted in FIG. 3). Meanwhile, the third set value X3 is a value that is smaller than the first set value X1 and is less than 5 km/h in terms of the bicycle speed (for example, 3.5 km/h).

According to this type of definition, the power supply amount to the lamp 20 and the power supply amount to the storage battery 54 become as follows. The DC power generated by the power generation of the AC generator 16 increases as the frequency of the pulsating flow increases. For this reason, both the power supply amount to the lamp 20 and the power supply amount to the storage battery 54 increase as the frequency of the pulsating flow increases. When the frequency of the pulsating flow is the first set value X1, the DC power is evenly distributed to the storage battery 54 and the lamp 20. When the frequency of the pulsating flow is within a range that is greater than or equal to the first set value X1 and less than or equal to the second set value X2, the distributed amount to the lamp 20 becomes greater than the distributed amount to the storage battery 54. When the frequency of the pulsating flow is less than or equal to the third set value X3, the DC power is preferentially distributed to the lamp 20.

Based on such a distribution map, the applied voltage for powering the lamp 20 may be predetermined as follows. The DC power is estimated from the frequency of the pulsating flow and the characteristic of the AC generator 16. For this reason, the DC power that is distributed to the lamp 20 can be defined from the frequency of the pulsating flow and the distribution map. Then, when the DC power that is distributed to the lamp 20 has been defined, the applied voltage that is to be applied to the lamp 20 may be defined in consideration of the characteristic of the lamp 20. Given this situation, there is the possibility of defining the applied voltage to the lamp 20 with respect to the frequency of the pulsating flow, based on the distribution map. If the distributed amount of the DC power to the lamp 20, of the DC power that is output from the AC generator 16, is defined, the remaining DC power will be stored in the storage battery 54. That is, a control map can be created based on the distribution map.

The controller 58 forms a control signal based on a control map that is derived in this way, controls the drive circuit 64 based on the control signal, and controls the power consumption of the lamp 20. Thus, the DC power is distributed so as to follow the ratio of a predefined distribution map.

Figure 4:
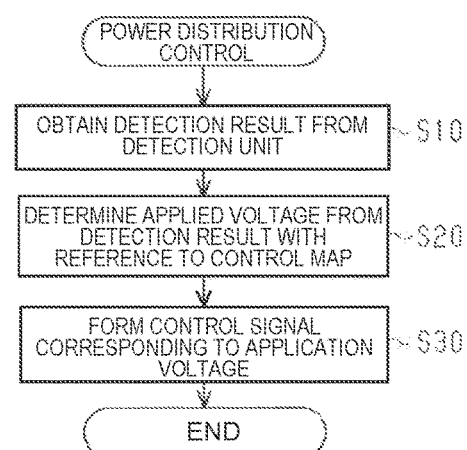
FIG. 4 is a flowchart for a power distribution control that is executed by the controller of the bicycle power control apparatus.

A flow of the power distribution control that is executed by the controller 58 will be described with reference to FIG. 4. The power distribution control is a process tier controlling the ratio of the distributed amount regarding the DC power. The power control process is periodically executed after activating the controller 58 to prior to stopping.

In step S10, the controller 58 obtains the detection result from the detection unit 56. In the present embodiment, the controller 58 receives an electrical signal (a pulse signal) that corresponds to the frequency of the pulsating flow from the detection unit 56.

In step S20, the applied voltage corresponding to the detection result (the electrical signal) is read with reference to the control map. In step S30, a control signal corresponding to the applied voltage is formed, and the control signal is output to the drive circuit 64.

Figure 5:
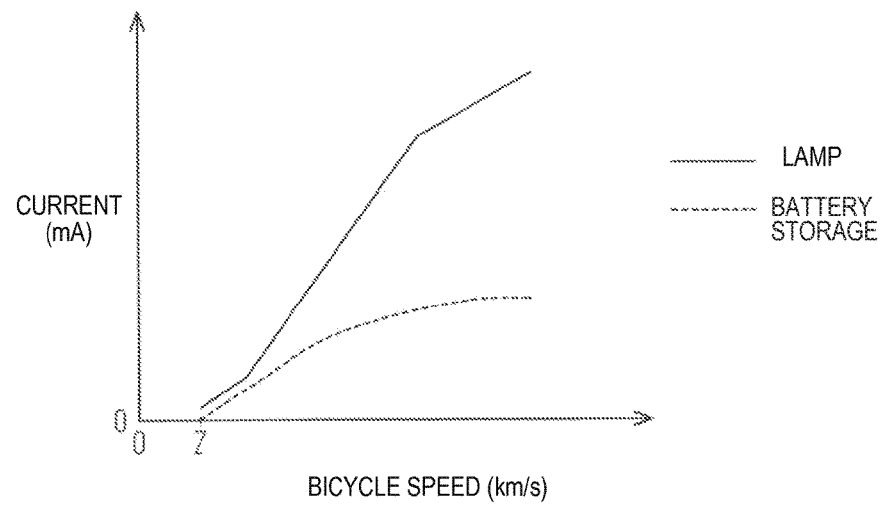
FIG. 5 is a graph showing the relationship of the current with respect to the bicycle speed regarding a lamp and a storage battery.

The effect of the power control process is described with reference to FIG. 5. FIG. 5 is a graph showing the relationship between the bicycle speed and the current that flows in the storage battery 54, as well as the relationship between the bicycle speed and the current that flows in the lamp 20.

As shown in FIG. 5, the current that flows in the storage battery 54 when the bicycle traveling speed is Z km/h (for example, 3.5 km/h) is "0," and the current that flows in the lamp 20 is greater than 0. As the bicycle speed increases, both the current amount flowing in the lamp 20 and the current amount flowing in the storage battery 54 increase. Additionally, the increase rate of the current with respect to the increase in the bicycle speed is greater with the lamp 20 than with the storage battery 54. In this way, according to the power control process, changing the ratio of the distributed amount to the lamp 20 to the distributed amount to the storage battery 54 regarding the DC power is possible, depending on the bicycle speed. Accordingly, adjusting the emission intensity of the lamp 20 in the desired manner to be within the range of conditions in which the sum of the power consumption of the lamp 20 and the charging power to the storage battery 54 does not exceed the generated power is possible.

The effects of the bicycle power control apparatus 18 will be described below.

(1) In the present embodiment, the detection unit 56 detects an electrical signal from the AC generator 16, and the controller 58 controls the ratio (M2/M1) of the distributed amount (M1) of the DC power to the lamp 20 (the electric component) with respect to the distributed amount (M2) of the DC power to the storage battery 54, according to the detection result from the detection unit 56.

According to this configuration, the ratio of the distributed amount of the DC power to the lamp 20 (the electric component) with respect to the distributed amount of the DC power to the storage battery 54 is not a constant but, rather, is controlled by the controller 58, depending on the detection result from the detection unit 56. If the ratio of the distributed amount is a constant, there were cases in which the distribution of the DC power to the storage battery 54 and to the lamp 20 was not appropriate, since the DC power would be distributed to the storage battery 54 and to the lamp 20 at a prescribed ratio, regardless of the detection result (for example, regardless of the amount of generated power) from the detection unit 56 that detects an electrical signal from the AC generator 16. For example, if the DC power is distributed to the storage battery 54 and the lamp 20 at a prescribed ratio even when the DC power is small, the emission intensity of the lamp 20 would become low, generating a situation in which the lamp would not be substantially lit. Additionally, if the DC power is large and the DC power is distributed to the storage battery 54 and to the lamp 20 at a prescribed ratio, there is the risk that the life of the lamp 20 is reduced because the emission intensity of the lamp 20 becomes too high.

In this regard, according to the configuration described above, since the controller 58 controls the ratio (M2/M1) of the distributed amount of the DC power to the lamp 20 (the electric component) with respect to the distributed amount of the DC power to the storage battery 54, according to the detection result from the detection unit 56 that detects an electrical signal from the AC generator 16, distributing the DC power to the storage battery 54 and the lamp 20 (the electric component) at a desired ratio is possible. For example, optimizing the distribution of the DC power, such as by distributing the DC power only to the lamp 20 when the DC power is small and distributing this power to the lamp 20 and the storage battery 54 at a prescribed ratio when the DC power is large, becomes possible. The bicycle power control apparatus 18 is able to distribute the generated power (the original power of the DC power) to the storage battery 54 and the lamp 20 (the electric component) at a desired ratio.

(2) In the present embodiment, the electrical signal from the AC generator 16 includes information that corresponds to the amount of power generated b the AC generator 16. For example, the electrical signal from the AC generator 16 is the frequency of the pulsating flow that is output from the rectifier 52. The greater the value of the frequency of the pulsating flow, the greater the amount of generated power; therefore, the frequency of the pulsating flow corresponds to information that corresponds to the amount of power generated by the AC generator 16.

(3) In the present embodiment, the controller 58 outputs a control signal that corresponds to the above-described distributed amount ratio to the drive circuit 64. That is, the controller 58 defines the DC power that is distributed to the storage battery 54 by defining the DC power that is distributed to the lamp 20. The ratio of the distributed amount to the lamp 20 and the distributed amount to the storage battery 54 regarding the DC power is thereby controlled.

(4) In the present embodiment, the controller 58 sets the distributed amount of the DC power to the storage battery 54 to 0 when the bicycle speed is less than or equal to the third set value X3 (a prescribed value). For example, the third set value X3 (prescribed value) is defined as a value that is less than 5 km/h (for example, 3.5 km/h).

According to this configuration, the DC power is consumed in the lamp 20 when the bicycle speed that corresponds to the speed parameter is less than or equal to a prescribed value. For this reason, as compared to when storing a part of the DC power, exerting the function of the lamp 20 at a high level is possible (for example, increasing the emission intensity in the case of a lamp 20).

(5) In the present embodiment, the controller 58 comprises a conversion map in which the frequency of the pulsating flow and the ratio are associated. In the control map, the ratio is defined as a value that is greater than or equal to 1 when the bicycle speed is within a range that is greater than or equal to the first set value X1. According to this configuration, when the bicycle speed is within a range that is greater than or equal to the first set value X1, the distributed amount that is supplied to the lamp 20 (the electric component) becomes greater than the distributed amount that is supplied to the storage battery 54.

(6) In the present embodiment, in the control map, the ratio of the distributed amount is defined to increase as the frequency of the pulsating flow increases. That is, the ratio of the distributed amount of the DC power that is supplied to the lamp 20 becomes higher as the bicycle speed, which is a value that corresponds to the frequency of the pulsating flow, increases.

Even when the ratio of the distributed amount is a prescribed value (constant), the amount of generated power increases as the bicycle speed increases. Therefore, the emission intensity of the lamp 20 increases as the bicycle speed increases, extending the range of view farther. However, according to the configuration described above, the range of view can be extended even more. As a result, improving safety while traveling is possible. This effect is especially notable during the night or when visibility is low due to fog.

(7) In the present embodiment, the lamp 20 (the electric component) and the storage battery 54 are connected in parallel to the AC generator 16. According to this configuration, controlling the DC power that is supplied to the storage battery 54 becomes possible by controlling the power consumption of the lamp 20; as a result, controlling the ratio of the distributed amount to the lamp 20 to the distributed amount to the storage battery 54 becomes possible.

Even in a configuration in which the lamp 20 (the electric component) and the storage battery 54 are connected in series, controlling the ratio of the distributed amount to the lamp 20 to the distributed amount to the storage battery 54 becomes possible by controlling the current that flows in a bypass circuit by providing a bypass circuit in the lamp 20.

(8) In the present embodiment, the bicycle power control apparatus 18 comprises an overcharge protection circuit 60 that stops the power supply to the storage battery 54 when the inter-terminal voltage of the storage battery 54 is greater than or equal to an upper limit voltage value. With this configuration, the storage battery 54 is prevented from being overcharged, and preventing the life of the storage battery 54 from being reduced is possible.

OTHER EMBODIMENTS

The above-described embodiment can be modified in the following manner.

In the embodiment described above, the bicycle power control apparatus 18 does not include the drive circuit 64 of the lamp 20, but the bicycle power control apparatus 18 may be configured to comprise the drive circuit 64. In this case, the drive circuit 64 is removed from the lamp 20.

In the embodiment described above, the detection unit 56 detects an electrical signal from the AC generator 16 to estimate the amount of power that is generated by the AC generator 16. Instead of such a configuration, the detection unit 56 may be configured to detect an electrical signal from a rotational speed sensor that detects the rotational speed of the front wheel 6 or the rear wheel 8. This is because the rotational speed of a wheel can be used to estimate the amount of generated power.

In the embodiment described above, the bicycle power control apparatus 18 comprises one specific electric component (lamp 20), but the number of specific electric components is not limited. For example, if the bicycle power control apparatus 18 comprises a plurality of electric components, the controller 58 controls the distributed amount of the DC power for each electric component via the drive circuit 64.

The bicycle power control apparatus 18 may comprise, for example, an electric derailleur 22 (an electric transmission) of the bicycle 2, an electric suspension of the bicycle 2, or an electric seatpost of the bicycle 2 as an electric component that is separate from the specific electric component. Furthermore, the bicycle power control apparatus 18 may comprise a switch for operating at least either the electric derailleur 22 (an electric transmission), an electric suspension, or an electric seatpost as an electric component that is separate from the specific electric component. The bicycle power control apparatus 18 may comprise at least one of the electric components above. These electric components are connected in parallel with respect to the AC generator 16, to which DC power is supplied from the storage battery 54.

Figure 6:
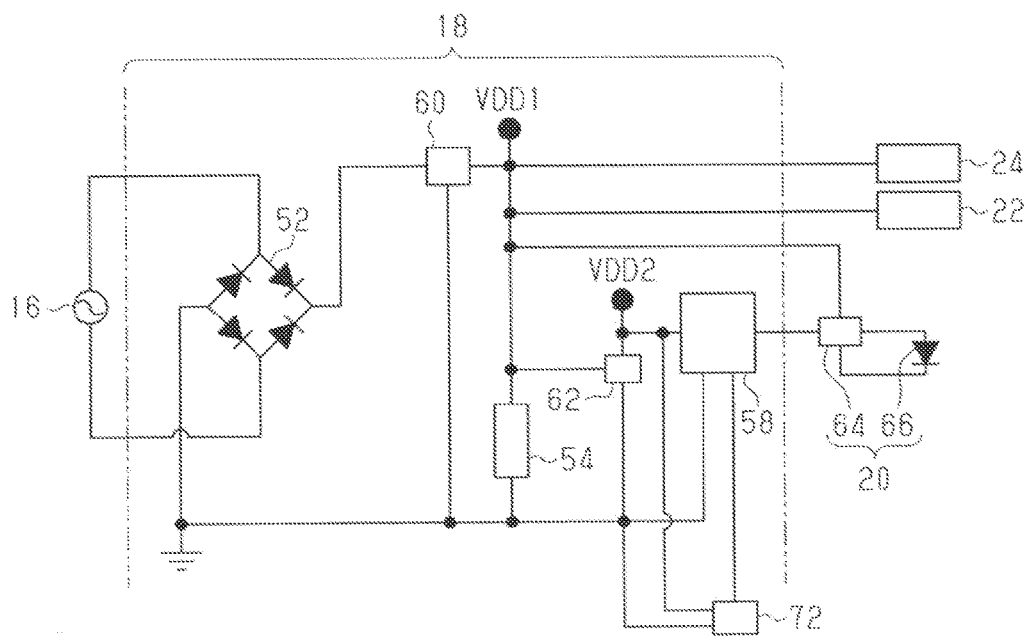
FIG. 6 is a block diagram of a bicycle power control apparatus according to a modified example.

The bicycle power control apparatus 18 may be configured as follows. FIG. 6 shows a block diagram of a bicycle power control apparatus 18 according to a modified example. The same reference symbols have been given to the same components of the embodiment in the description.

The bicycle power control apparatus 18 comprises the rectifier 52, the storage battery 54 that stores the DC power that is output by the rectifier 52, the detection unit 72 for detecting traveling speed of the bicycle 2 (for example, a rotational speed sensor of the wheel), and the controller 58. The ratio of the distributed amount of the DC power to the electric component with respect to the distributed amount of the DC power to the storage battery 54 is controlled by the controller 58, depending on the detection result from the detection unit 72. That is, the configuration of the detection unit 56 is different from the above-described embodiment. The detection unit 72 comprises, for example, a magnetic sensor or an optical sensor, to which power is supplied from the storage battery 54.

In this example, the detection unit 72 detects the traveling speed of the bicycle 2. The traveling speed of the bicycle 2 is a parameter related to the amount of generated power from the AC generator 16, so that the bicycle power control apparatus 18 according to this modified example exerts an effect pursuant to the effects of the bicycle power control apparatus 18 according to the embodiment.

White only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A bicycle power control apparatus comprising:
   a rectifier configured to rectify power generated by an AC generator that is mounted on a bicycle;
   a storage battery configured to store DC power outputted by the rectifier, and configured to supply the DC power to an electric component that is mounted to the bicycle;
   a detection unit configured to detect an electrical signal from the AC generator, the electrical signal comprising information corresponding to an amount of power generated by the AC generator; and
   a controller configured to control a ratio of a distributed amount of the DC power to the electric component with respect to a distributed amount of the DC power to the storage battery such that the ratio changes according to the detection result of the detection unit when the detection result is in a range of greater than or equal to a first set value and smaller than or equal to a second set value that is larger than the first set value,
   the controller being configured to set the ratio to one such that the DC power is distributed evenly to the storage battery and the electrical component when the detection result is equal to the first set value,
   the controller being configured to distribute the DC power only to the electric component and not to the storage battery when the detection result is less than or equal to a third set value smaller than the first set value.

2. The bicycle power control apparatus as recited in claim 1, wherein
   the controller is configured to output a control signal that corresponds to the ratio to a drive circuit for driving the electric component.

3. The bicycle power control apparatus as recited in claim 2, wherein
   the controller is configured to modulate a pulse width based on the ratio, form a pulse width modulation signal, and control the drive circuit based on the pulse width modulation signal, and
   the drive circuit is configured to form an applied voltage that corresponds the DC power to the pulse width modulation signal and apply the applied voltage to the electric component.

4. The bicycle power control apparatus as recited in claim 1, wherein
   the electric component and the storage battery are connected in parallel with respect to the AC generator.

5. The bicycle power control apparatus as recited in claim 1, further comprising
   an overcharge protection circuit configured to stop power being supplied to the storage battery while an inter-terminal voltage of the storage battery is greater than or equal to an upper limit voltage value.

6. The bicycle power control apparatus as recited in claim 1, wherein
   the electric component is a lamp.

7. The bicycle power control apparatus as recited in claim 1, wherein
   the electric component is a portable battery.

8. The bicycle power control apparatus as recited in claim 1, further comprising
   a separate electric component that is separate from the electric component and connected in parallel to the storage battery.

9. The bicycle power control apparatus as recited in claim 8, wherein
   the separate electric component comprises at least one of a bicycle electric transmission, a bicycle electric suspension, a bicycle electric seatpost, and an operating switch, and the operating switch is configured to operate at least one of the bicycle electric transmission, the bicycle electric suspension and the bicycle electric seatpost.

10. The bicycle power control apparatus as recited in claim 1, wherein
at least the storage battery and the controller are housed in a case that is configured to be attached to the bicycle.

11. A bicycle power control apparatus comprising:
a rectifier configured to rectify power generated by an AC generator that is mounted on a bicycle;
a storage battery configured to store DC power outputted by the rectifier, and configured to supply the DC power to an electric component that is mounted to the bicycle;
a detection unit configured to detect an electrical signal indicating a speed parameter, which is related to a bicycle speed; and
a controller configured to control a ratio of a distributed amount of the DC power to the electric component with respect to a distributed amount of the DC power to the storage battery such that the ratio changes according to the speed parameter when the speed parameter is in a range of greater than or equal to a first set value and smaller than or equal to a second set value that is larger than the first set value,
the controller being configured to set the ratio to one such that the DC power is distributed evenly to the storage battery and the electrical component when the speed parameter is equal to the first set value,
the controller being configured to distribute the DC power only to the electric component and not to the storage battery when the speed parameter is less than or equal to a third set value smaller than the first set value.

12. The bicycle power control apparatus as recited in claim 11, wherein
the detection unit is configured to detect a frequency of a pulsating flow, which is formed in the rectifier, as the speed parameter.

13. The bicycle power control apparatus as recited in claim 11, wherein
the detection unit is configured to detect a ripple frequency of a direct current, which is formed in the rectifier, as the speed parameter.

14. The bicycle power control apparatus as recited in claim 11, wherein
the detection unit is configured to use a rotor position detection signal, that is output from the AC generator, as the speed parameter.

15. The bicycle power control apparatus as recited in claim 11, wherein
the detection unit is configured to detect a rotational speed of a wheel as the speed parameter.

16. The bicycle power control apparatus as recited in claim 11, wherein
the detection unit is configured to pulse the speed parameter and outputs the speed parameter to the controller.

17. The bicycle power control apparatus as recited in claim 11, wherein
the prescribed value is a value that is less than 5 km/h.

18. The bicycle power control apparatus as recited in claim 11, wherein
the controller includes a map in which the speed parameter and the ratio are associated, and
the ratio is defined as a value that is greater than or equal to one when the bicycle speed corresponding to the speed parameter is within a range that is greater than the first set value in the control map.

19. The bicycle power control apparatus as recited in claim 18, wherein
the controller has a map in which the speed parameter and the ratio are associated, and the ratio is defined to increase as the speed parameter in the map increases.

20. The bicycle power control apparatus as recited in claim 11, wherein
the controller has a map in which the speed parameter and the ratio are associated, and
the ratio is defined so that the distributed amount of the DC power to the electric component increases as the speed parameter increases.

21. A bicycle power control apparatus comprising:
a rectifier configured to rectify power generated by an AC generator that is mounted on a bicycle;
a storage battery configured to store DC power outputted by the rectifier, and configured to supply the DC power to an electric component that is mounted to the bicycle;
a detecting unit configured to detect a bicycle traveling speed; and
a controller configured to control a ratio of a distributed amount of the DC power to the electric component with respect to a distributed amount of the DC power to the storage battery such that the ratio changes according to the bicycle traveling speed when the bicycle traveling speed is in a range of greater than or equal to a first set value and smaller than or equal to a second set value that is larger than the first set value,
the controller being configured to set the ratio to one such that the DC power is distributed evenly to the storage battery and the electrical component when the bicycle traveling speed is equal to the first set value,
the controller being configured to distribute the DC power only to the electric component and not to the storage battery when the bicycle traveling speed is less than or equal to a third set value smaller than the first set value.

* * * * *